US007065559B1

(12) United States Patent
Weiss

(10) Patent No.: US 7,065,559 B1
(45) Date of Patent: Jun. 20, 2006

(54) MEDIA BRIDGE METHOD AND APPARATUS

(75) Inventor: David Weiss, Plantation, FL (US)

(73) Assignee: Organon Wireless, Inc., Plantation, FL (US)

( * ) Notice: Subject to any disclaimer, the term of this patent is extended or adjusted under 35 U.S.C. 154(b) by 965 days.

(21) Appl. No.: 09/596,431

(22) Filed: Jun. 16, 2000

Related U.S. Application Data

(63) Continuation-in-part of application No. 09/505,845, filed on Feb. 17, 2000.

(51) Int. Cl.
G06F 15/16 (2006.01)

(52) U.S. Cl. .................................................. 709/219

(58) Field of Classification Search ........ 709/217–219; 705/14, 26; 235/462.01–462.46, 472.01–472.02
See application file for complete search history.

(56) References Cited

U.S. PATENT DOCUMENTS

| 4,159,417 A | 6/1979 | Rubincam |
| 4,406,626 A | 9/1983 | Anderson et al. |
| 4,518,361 A | 5/1985 | Conway |
| 4,602,152 A | 7/1986 | Dittakavi |
| 4,681,548 A | 7/1987 | Lemelson |
| 4,809,246 A | 2/1989 | Jeng |
| 4,994,987 A | 2/1991 | Baldwin |
| 5,001,696 A | 3/1991 | Baldwin |
| 5,059,126 A | 10/1991 | Kimball |
| 5,293,358 A | 3/1994 | Krause |
| 5,379,057 A | 1/1995 | Clough et al. |
| 5,575,659 A | 11/1996 | King et al. |
| 5,636,292 A | 6/1997 | Rhoads |
| 5,689,648 A | 11/1997 | Diaz et al. |
| 5,710,834 A | 1/1998 | Rhoads |
| 5,721,788 A | 2/1998 | Powell et al. |
| 5,745,604 A | 4/1998 | Rhoads |
| 5,748,763 A | 5/1998 | Rhoads |
| 5,748,783 A | 5/1998 | Rhoads |
| 5,761,485 A | 6/1998 | Munyan |
| 5,761,682 A | 6/1998 | Huffman et al. |
| 5,765,152 A | 6/1998 | Erickson |
| 5,768,426 A | 6/1998 | Rhoads |
| 5,809,160 A | 9/1998 | Powell et al. |
| 5,822,436 A | 10/1998 | Rhoads |
| 5,832,119 A | 11/1998 | Rhoads |

(Continued)

OTHER PUBLICATIONS

Article in The Wall Street Journal; Apr. 26, 2000, Market Place, pp. B1 & B4 "New Gizmos Alert Marketers When Ads Pique a Consumer's Interest".

(Continued)

Primary Examiner—David Wiley
Assistant Examiner—Joseph E. Avellino
(74) Attorney, Agent, or Firm—Nixon Peabody LLP; Donald R. Studebaker

(57) ABSTRACT

An apparatus and method for providing a bridge between tangible media and computer media. A bridge server computer system includes a database and a server control program. A client computer system includes a bridge control program and an input device adapted to receive a bridge code associated with a tangible media object. The bridge server computer system and the client computer system are coupled by a communications channel. The bridge control program is operative to send the bridge code from the client computer system to the bridge server and the server control program is operative to query the database based on the bridge code and execute action commands contained in the database in correspondence to the bridge code.

66 Claims, 8 Drawing Sheets

U.S. PATENT DOCUMENTS

| | | | | |
|---|---|---|---|---|
| 5,841,886 | A | 11/1998 | Rhoads | |
| 5,841,978 | A | 11/1998 | Rhoads | |
| 5,847,698 | A | 12/1998 | Reavey et al. | |
| 5,850,481 | A | 12/1998 | Rhoads | |
| 5,862,260 | A | 1/1999 | Rhoads | |
| 5,893,132 | A | 4/1999 | Huffman et al. | |
| 5,899,700 | A * | 5/1999 | Williams et al. | 434/308 |
| 5,930,377 | A | 7/1999 | Powell et al. | |
| 5,946,464 | A | 8/1999 | Kito et al. | |
| 5,956,048 | A | 9/1999 | Gaston | |
| 5,978,773 | A | 11/1999 | Hudetz et al. | |
| 5,991,594 | A | 11/1999 | Frober et al. | |
| 6,026,193 | A | 2/2000 | Rhoads | |
| 6,027,024 | A | 2/2000 | Knowles | |
| 6,064,979 | A | 5/2000 | Perkowski | |
| 6,081,629 | A | 6/2000 | Browning | |
| 6,098,106 | A | 8/2000 | Philyaw et al. | |
| 6,119,944 | A | 9/2000 | Mulla et al. | |
| 6,154,658 | A * | 11/2000 | Caci | 455/466 |
| 6,164,541 | A | 12/2000 | Dougherty et al. | |
| 6,199,048 | B1 | 3/2001 | Hudetz et al. | |
| 6,202,062 | B1 | 3/2001 | Cameron et al. | |
| 6,218,964 | B1 * | 4/2001 | Ellis | 340/990 |
| 6,237,031 | B1 | 5/2001 | Knauerhase et al. | |
| 6,311,214 | B1 * | 10/2001 | Rhoads | 709/217 |
| 6,311,896 | B1 * | 11/2001 | Mulla et al. | 235/472.03 |
| 6,321,991 | B1 * | 11/2001 | Knowles | 235/472.01 |
| 6,460,766 | B1 * | 10/2002 | Olschafskie et al. | 235/454 |
| 6,609,656 | B1 * | 8/2003 | Elledge | 235/382 |
| 6,611,623 | B1 * | 8/2003 | Konishi et al. | 709/219 |
| 6,616,038 | B1 * | 9/2003 | Olschafskie et al. | 235/454 |
| 6,681,028 | B1 * | 1/2004 | Rodriguez et al. | 382/100 |
| 6,707,581 | B1 * | 3/2004 | Browning | 455/556.1 |
| 6,708,208 | B1 * | 3/2004 | Philyaw | 709/223 |
| 6,813,396 | B1 * | 11/2004 | Hollstrom et al. | 382/305 |
| 2002/0065728 | A1 * | 5/2002 | Ogasawara | 705/23 |

OTHER PUBLICATIONS

Article in Pipeline "Songs in the Keychain of Life".

"Digimarc—Paper as Portal", Web address http://www.digimarc.com/portals/index.html.

"GoCode- About GoCode", Web address httl://www.gocode.net/about.htm.

"CNET.com-News-E-Business—Newspaper prints codes that link readers to the Web"; Web address http://news.cnet.com/news/0-1007-200-1798135.html?pt.ms..feed.me-home.

"New Media Books" Web address http://www.newmediabooks.com.

"No More Pencils, No More Books?"; Web address http://www.wired.com/news/technology/0,1282,34838,00.html.

"New Economy: Struggling to Make Good on the Promise of an Internet Revolution" by Susan Stellin, New York Times, dated Jan. 15, 2001, pp. 1-3.

* cited by examiner

| BRIDGE CODE | ACTION COMMAND |
|---|---|
| 42709 10028 | download copy of article in tangible media object to computer |
| 41370 10038 | download electronic coupon to computer |
| 54219 23400 | display Web page having links to articles related to tangible media object |
| 42709 10029 | display vendor Web page for ordering item in tangible media object |
| 42709 10030 | purchase vendor product using user account information |
| 47290 28100 | display Web page having travel and booking information |
| 54912 43200 | display Web page having movie review and preview video |

154 { (rows 1-7 bridge codes), 158 } (rows 1-7 action commands)

Fig. 4

MEDIA BRIDGE METHOD AND APPARATUS

RELATED APPLICATION DATA

This application is a continuation-in-part of application Ser. No. 09/505,845 filed on Feb. 17, 2000.

BACKGROUND OF THE INVENTION

1. Field of the Invention

The invention relates to a bridge between tangible media, such as printed media, and computer media. More specifically, the invention is a method and apparatus for hybridizing the subject matter of tangible media with related subject matter in media stored on a computer or related actions accomplished by a computer.

2. Description of the Related Art

In the early 1980s, the popularity of personal computers gave rise to the catch-phrase "paperless office" which refers to an environment in which all records are maintained in digital form on computer readable media as opposed to being kept as hard copies on paper. However, the utility and convenience of paper based records has never been matched by computer media. Thus, even when records are maintained in computer readable format, hard copies are often printed out for review.

Recent advances in communication, the Internet in particular, have facilitated on-line distribution of various information such as articles, advertisements, and even entire books. The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software viewers known as browsers and HTTP (hypertext transfer protocol) which allow a simple GUI (graphical user interface) to communicate over the Internet. Browsers generally reside on the computer used to access the Internet, i.e. the client computer. HTTP is a component of TCP/IP and provides users access to files of various formats using a standard page description language known as HTML (hypertext markup language), and more recently XHTML (extensible hypertext markup language) and XML (extensible markup language). The collection of servers on the Internet using HTTP has become known as the "World Wide Web" or simply the "Web."

Through HTML, and interactive programming protocols, the author of a particular Web page(s) is able to make information available to viewers of the Web page(s) by placing the Web page(s) on an Internet Web server in HTML format. The network path to the server is identified by a URL (Uniform Resource Locator) and, generally, any client running a Web browser can access the Web pages by the URL.

The Web has become ubiquitous in businesses and homes because it has proven to be convenient for various applications, such as news and data delivery, conducting banking and investment transactions, and the like. The Web and its authoring, transmission, and display protocols, such as browsers, HTML, CGI (common gateway interface), Active Server Pages™, and Java™, have become a worldwide standard for information exchange.

However, even the convenience of the Web and the advances in the resolution and size of computer displays has not advanced computer media to the level of comfort and convenience of print media in the eyes of most people. For example, computers and computer displays are too bulky to use as a media for reading the morning newspaper. Some modern computers are very small but generally the displays thereon are also small and have low resolution as compared to the typical magazine or newspaper. Also, there is a certain tactile feel to printed media, such as a glossy magazine or a newspaper, which many people prefer over a computer display.

Further, the Web is analogous to the world's biggest library without a card catalogue. A wealth of information is available but difficult to find. Search engines only serve to reduce the amount of material that the user must manually sift through to find the desired document. Also, from an advertiser's standpoint, printed media, such as a magazine, is desirable because it often remains in the reader's possession, in a visible place, for many days and thus advertisements in printed media often are more effective than web site advertisements which are constantly changing and depend on search engines and other unreliable methods for being viewed. Specifically, search engine criterion can change in a dynamic, and even fickle, manner and thus advertisements on the Internet are not viewed in a reliable manner. Accordingly, even the Web and proliferation of laptop and handheld computing devices has not displaced printed media in many instances.

As disclosed in U.S. Pat. No. 5,956,048, it is well known to download books from a network to a portable or handheld computer. Also, many printed articles and advertisements include a printed URL, i.e. a Web address, to permit readers to access additional information about the article or advertised product by manually accessing the Web. Further, it is well known to download coupons from a computer network, print the coupons on a printer, and take the printed coupons to a retail store for redemption.

U.S. Pat. No. 5,841,978 discloses a network linking system. Information, such as a URL, is embedded in a data object, such as an image file. Software tools permit the data object to be used as a link to another data object, Web page, or the like. This patent discloses merely a different way of linking computer media to other computer media. This reference does not teach or suggest a link between tangible media, such as printed media, and computer media.

U.S. Pat. No. 5,899,700 discloses a connection between print media and computer media. A store of information is created specifically for the connection system and categorized. Codes corresponding to the categories of the store are placed in printed media. When a code is entered, the entire category of information is displayed instantly. This patent relates solely to didactic material and is quite limited in how the media is connected. This reference fails to teach or suggest that an independent database can be used to correlate codes to existing specific files or actions. In fact, this patent only discloses that full categories of information can be displayed and does not teach or suggest various actions, such as purchase procedures or the like, can be accomplished in response to entry of a code. Further, because the information disclosed in this patent is in the form of a predefined categorized store, the information is not easily modified or adapted to applications other than education with respect to predefined categories.

There are also known systems in which a code from printed media can be utilized to take the viewer directly and immediately to a related Web page. While these systems do provide a link between printed media and computer media, such systems do not provide temporal control of access, such as later access, to the computer media. Therefore, these systems are not very flexible. For example, such systems are not useful for mobile devices, such as handheld computers, wireless communication devices, personal digital assistants, or the like because the displays thereof are limited in size, color saturation, and resolution.

While each of these technologies incorporates certain aspects of print media and computer media separately, none of these technologies hybridize print media and on-line media in a seamless manner. Finally, the conventional systems fail to permit temporal control of a link between tangible media and computer media.

SUMMARY OF THE INVENTION

It is an object of the invention to hybridize tangible media with computer media.

It is another object of the invention to combine the flexibility of computer media with the tactile feel and presence of tangible media.

It is another object of the invention to facilitate the collection and storage of computer media objects from tangible media to permit temporal control of access to computer media.

It is another object of the invention to facilitate use of portable wireless communication devices for collecting computer media objects from tangible media.

It is another object of the invention to target promotional media accurately to persons who have expressed an interest in related subject matter.

It is another object of the invention to facilitate access to on-line archived content.

It is another object of the invention to facilitate location of desired information on a network such as the Internet.

It is another object of the invention to distribute coupons and other promotions in a flexible manner.

To achieve these and other objects, the invention provides a seamless bridge or hybridization between tangible media (i.e., media discernable by the human senses without the need for a computing device) and computer media (i.e., media that is readable by a computing device to be discernable by human senses, such as sight or sound).

A first aspect of the invention is a computer architecture for providing a bridge between tangible media and computer media comprising a bridge server computer system including a database and a server control program, a client computer system including a bridge control program and an input device adapted to receive a bridge code associated with a tangible media object, and a communications channel coupling the bridge server computer system and the client computer system. The bridge control program is operative to send a bridge code entered through the input device from the client computer system to the bridge server and the server control program is operative to query the database based on the bridge code and execute action commands contained in the database in correspondence to the bridge code.

A second aspect of the invention is a method for bridging tangible media and computer media comprising the steps of creating a database of bridge codes and action commands corresponding to the bridge codes, inputting a bridge code associated with a tangible media object into a client computer system, communicating the bridge code from the client computer system to a bridge server, querying the database based on the bridge code, and executing action commands stored in the database in correspondence to the bridge code.

BRIEF DESCRIPTION OF THE DRAWING

The invention is described through a preferred embodiment and the attached drawing in which:

FIG. 4 is a table representing the contents of the database of the preferred embodiment;

DETAILED DESCRIPTION OF THE PREFERRED EMBODIMENT

Figure 1:
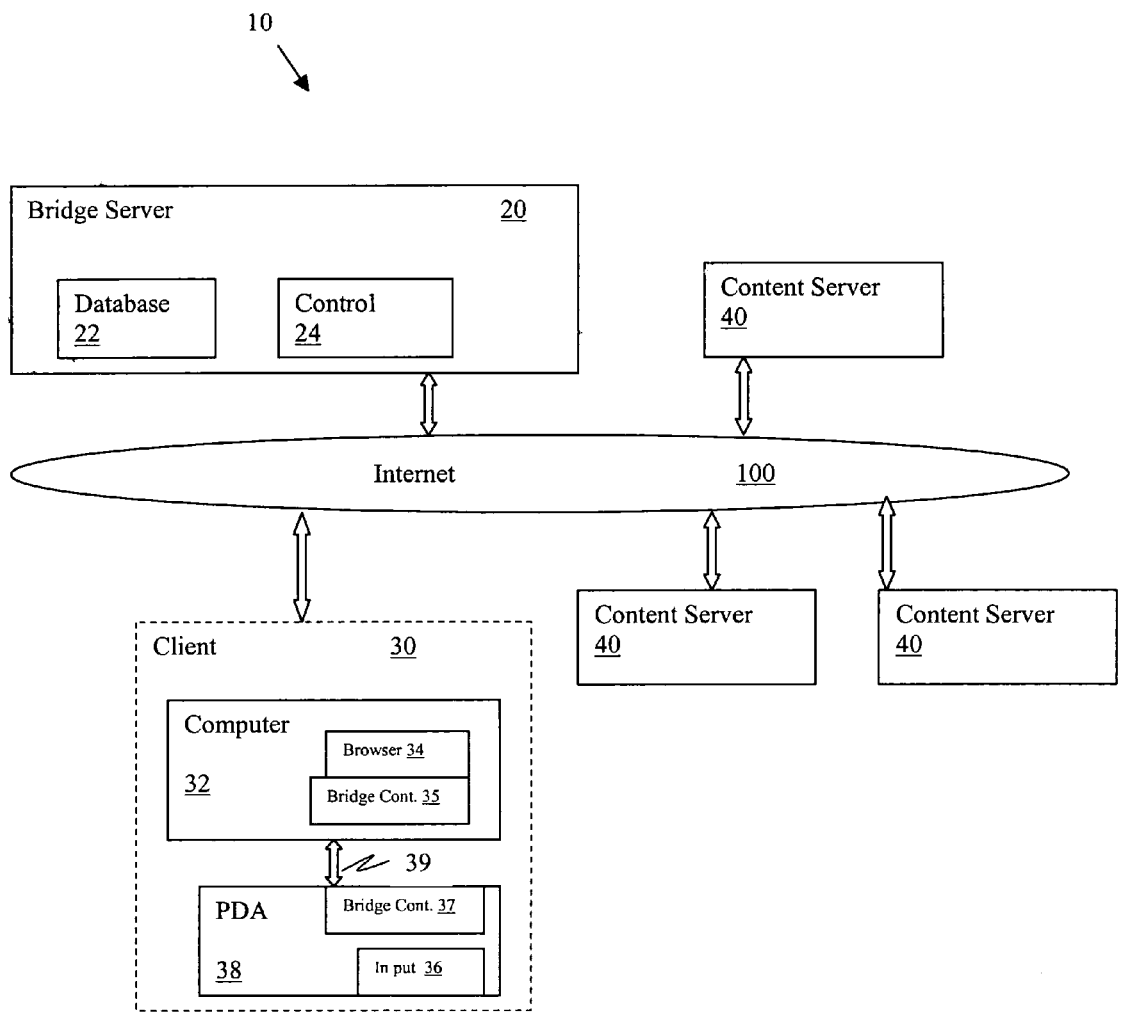
FIG. 1 is a block diagram of a computer architecture of the preferred embodiment.

A first preferred embodiment of media bridge system 10 is illustrated in FIG. 1. Client computer system 30, executing browser application 34 that supports the HTTP protocol, is connected typically through an ISP (Internet Service Provider), to the Internet 100. For example, client computer system 30 can be coupled to the ISP via a conventional dial up connection using a modem or through a broadband connection such as ISDN (Integrated Services Digital Network), a cable modem, or a DSL (Digital Subscriber Line) connection. Bridge server computer system 20 is also coupled to the Internet 100 in a known manner. Bridge server computer system 20 executes a Web server control application 24, known as an HTTP server application, stored in a memory. In addition, bridge server computer system 20 can have at least one, though typically many, Web pages stored in a memory device thereof as files in HTML format and/or other formats. Further, bridge server 20 includes database 22 stored in the memory device as described in detail below.

Content servers 40 can also be connected to client computer system 30 and bridge server computer system 20 through the Internet 100. In the preferred embodiment, the Internet 100 serves as a communication channel. However, any type of communication channel can be used. For example, the communication channel can be a LAN (local area network), a WAN (wide area network), or the like using any type of communication hardware and protocols. Communication can be accomplished over electric cable, fiber optic cable, any other cable, or in a wireless manner using radio frequency, infrared, or other technologies.

Client computer system 30 of the preferred embodiment includes computer 32, a personal computer for example, coupled to the Internet 100 and PDA (personal digital assistant) 38 adapted to be selectively coupled to computer 32 through local communications channel 39. PDA 38 preferably is a handheld device, such as devices sold under the tradename PALM™ or devices sold under various tradenames, such as PocketPC™, adapted to run the WINDOWS CE™ operating system. However, PDA 38 can be any type of portable computing device, thin client, or the like. Computer 32 can request a display of a Web page stored on bridge server 20 by issuing a URL request through the Internet 100 to bridge server computer system 20 in a known manner. A URL consistent with the present invention may be a simple URL of the form:

<protocol identifiers>://<server path>/<web page path>

A "protocol identifier" of "http" specifies the conventional hyper-text transfer protocol. A URL request for a secure Internet transaction typically utilizes the secure protocol identifier "https," assuming that browser 34 and Web server control application 24 are presumed to support and implement the secure sockets layer. The "server path" is typically of the form "prefix.domain," where the prefix is typically "www" to designate a Web server and the "domain" is the standard Internet sub-domain.top-level-domain of bridge server computer system 20. The optional "web page path" is provided to specifically identify a particular hyper-text page maintained on bridge server computer 20 content servers 40, or another server.

In response to a received URL identifying an existing Web page, bridge server computer system 20 can return the Web page, subject to the HTTP protocol, to client computer system 30 for display on client computer system 30. This Web page typically incorporates both textural and graphical information including embedded hyper-text links that permit the user of client computer system 30 to readily select a next URL or send other data over the Internet 100.

The URL issued from client computer system 30 may also be of a complex form that identifies a CGI program (or script) on bridge server computer system 20. The CGI program, permits interactivity between client computer system 30 and bridge server computer system 20 through the Web via HTTP. CGI is a standard for external gateway programs to interface with information servers, such as HTTP or Web servers. A plain HTML document that the Web server delivers is static, which means it doesn't change. A CGI program, on the other hand, is executed in real-time, so that it can output dynamic information, such as the results of a database query. A HTML hyperlink reference that identifies a CGI program is typically of the form:

<form action-http://www.vendor.com/cgi-bin/bridge.cgi method=post>

A hyper-text link of this form directs the execution of the bridge.cgi program on an HTTP server, such as bridge server computer system 20 in response to a command from client computer system 30. In the preferred embodiment, bridge.cgi is a routine in server control application 24 of bridge server computer system 20 which queries database 22 and executes instructions based on the query result, as described in detail below.

PDA 38 of client computer system 30 includes input device 36 for inputting a bridge code 154 (see FIG. 2 and the description below) into client computer system 30. Input device 36 of the preferred embodiment is a bar code scanner. However, input device 36 can be a keypad, keyboard, bar code reader, text scanner, image scanner, set of thumbwheels, or any other device for inputting the bridge code. The bridge code is an identifier, such as a number, a word, alpha-numerics, an image, or the like, for identifying a tangible media object in media bridge system 10. The phrase "tangible media object," as used herein, refers to any object of tangible media, such as a newspaper article, a magazine article, an advertisement, a book, portions thereof, or the like.

Figure 2:
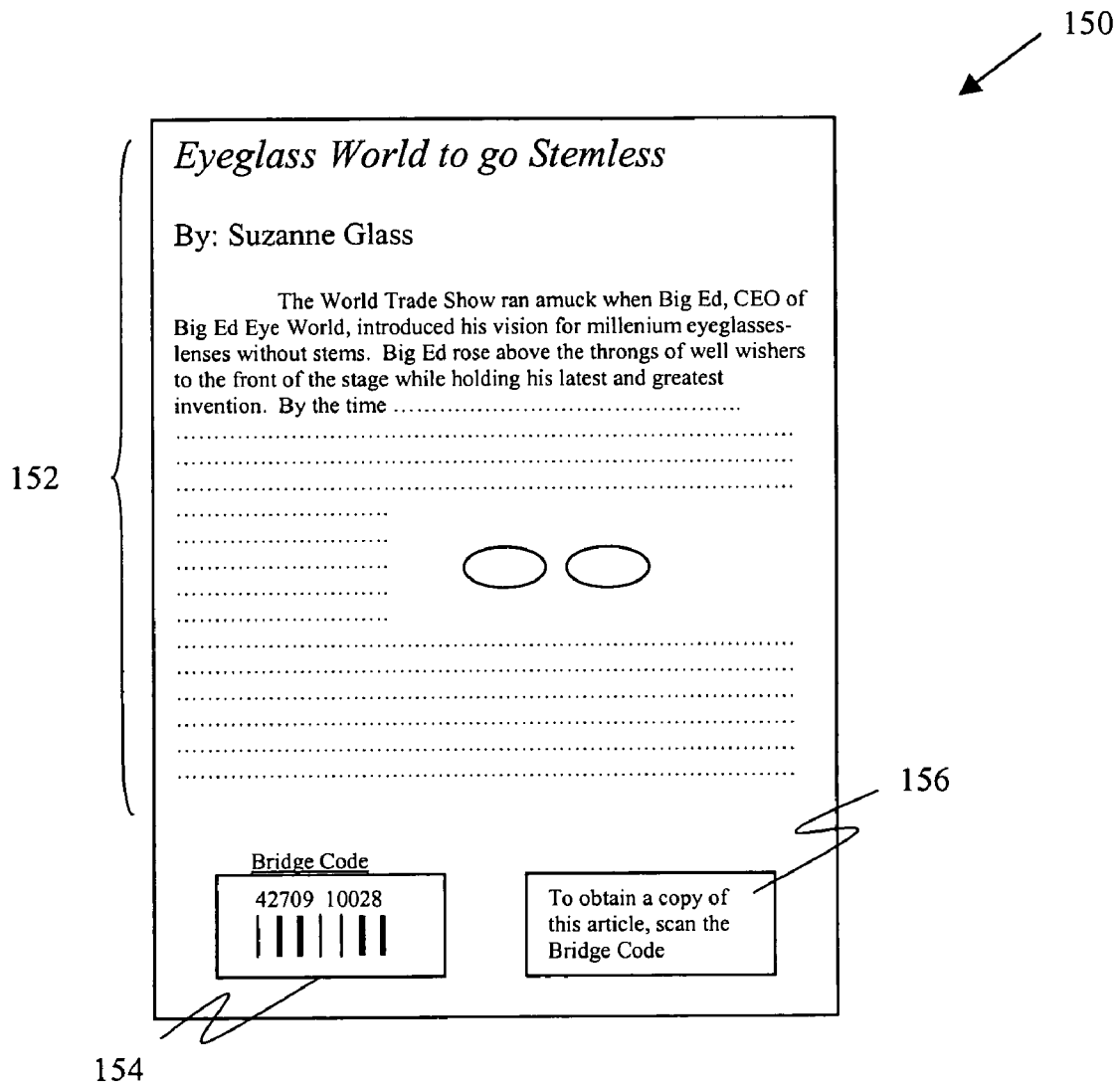
FIG. 2 illustrates an example of a tangible media object of the preferred embodiment.

FIG. 2 illustrates an example of a tangible media object. Tangible media object 150 of the preferred embodiment is in the form of an article in a newspaper, magazine, or the like. Tangible media object 150 includes body 152 having a title, a byline, text, and an illustration. Tangible media object 150 also includes bridge code 154, in the form of a bar code in the preferred embodiment, and bridge code instructions 156 as text or some other indicator. Conventionally, if a person coming across an article desires to save the article, the person will save the magazine or newspaper, tear the article out of the magazine or newspaper, or photocopy the article. However, these procedures all require that the person catalog or otherwise keep track of the article or copy for later review. Also, these procedures do not permit the article to be edited or otherwise manipulated digitally. On the other hand, the user could scan the article using a known image scanner and possibly convert the scanned image into text with OCR (optical character recognition) software. However, this procedure is tedious.

Figure 3:
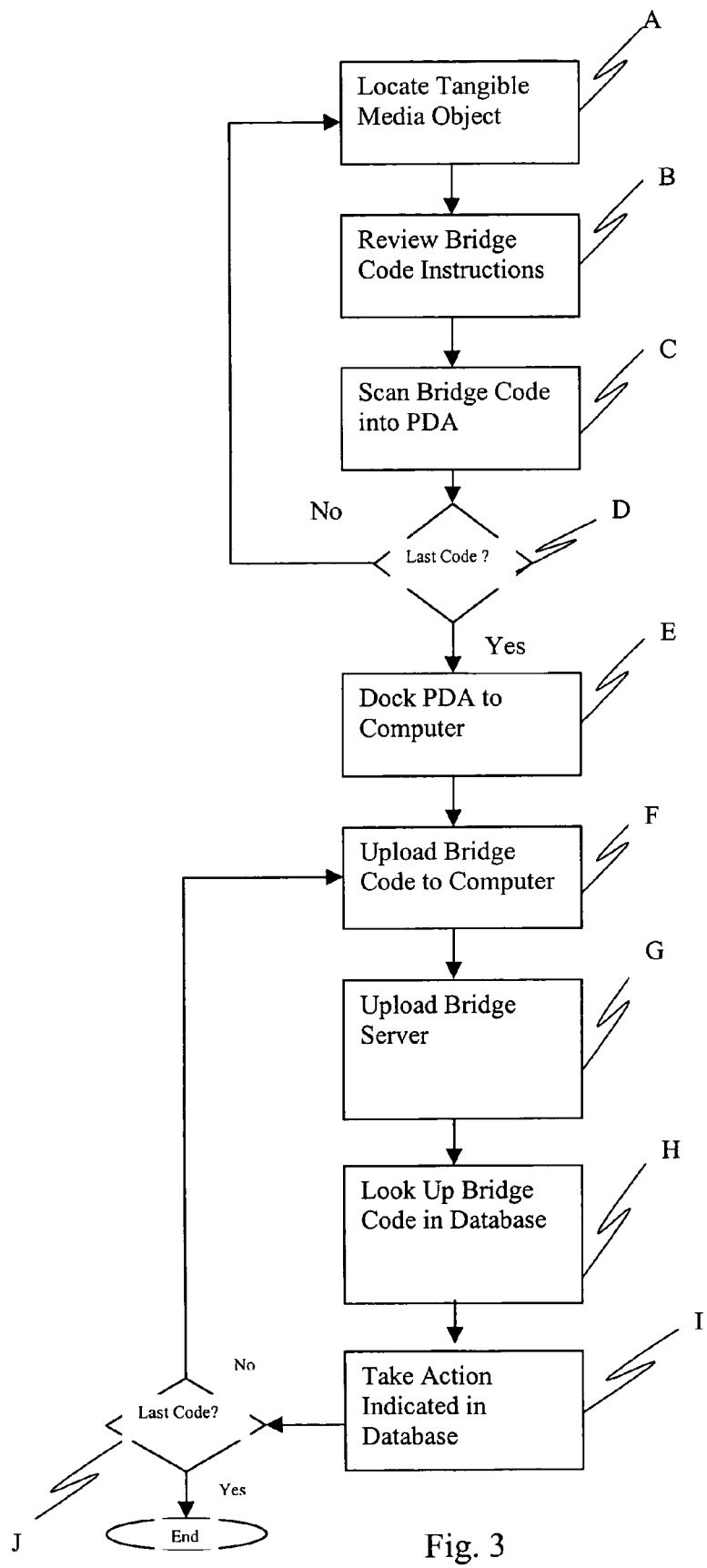
FIG. 3 is a flowchart of the bridging method of the preferred embodiment.

In the preferred embodiment, the person need only input bridge code 154 into PDA 38, as indicated in bridge code instructions 156 to obtain a digital copy of the article. FIG. 3 illustrates the procedure for obtaining a copy of the article of tangible media object 150. In step A, the user locates tangible media object 150. For example, the person may be reading a magazine and find tangible media object 150 containing an article of interest. In step B, the user reviews bridge code instructions 156 to ascertain what actions will be accomplished by entering bridge code 154 into PDA 38. In this example inputting bridge code 154 will eventually result in the user obtaining a copy of the article. However, it will become apparent below that one or more of many actions can occur as a result of inputting bridge code 154.

Assuming that the action indicated in bridge code instructions 156 is desirable to the user, the user then inputs bridge code 154 by scanning bridge code 154 into PDA 38 using input device 36 in step C. For example, input device 36 can have a wand or raster scanning laser for scanning the bar code of bridge code 154 in a known manner. As a result of step C, bridge code 154 is stored in PDA 38 in accordance with bridge control program 37. Note that bridge control program 37 can be loaded and executed using the conventional user interface of PDA 38. Note that PDA 38 is portable and thus can be readily available at all times to make the collection of bridge code 154 in steps A through C convenient. For example, collection of bridge code 154 can be accomplished while the person is away from their office, and even on an airplane or at sea, because a continuous connection with computer 32 is not required.

In step D, the user decides if the previously scanned bridge code 154 is the last code to be inputted at this time. If not, the procedure can return to step A for execution of steps A through D for any other bridge codes to be scanned. For example, tangible media object 150 may have plural bridge codes and plural corresponding bridge code instructions. One bridge code may be used to obtain a copy of the article, as described above, and another bridge code may be used to view or obtain copies of related articles. Still another bridge code can be used to purchase an item discussed in the article by logging in to a vendor server. Bridge code 154 can be used to accomplish virtually any function related to tangible media object 150, as discussed in greater detail below. Of course, steps A through D can be executed for plural tangible media objects.

When all desired bridge codes have been scanned into PDA 38, scanned bridge codes can be uploaded from PDA 38 to computer 32. Ordinarily, the uploading will be accomplished the next time the person returns to their office or other location of computer 32. At this time, PDA 38 is placed in communication with computer 32 through local communication channel 39 in step E. Local communication channel 39 can include a docking station of PDA 38 and a serial link, USB (universal serial bus) link, infrared link (such as an IrDA link), a wireless link such as "bluetooth," or any other hardware and/or software for establishing communication between PDA 38 and computer 32. In step F, the scanned bridge codes are uploaded from PDA 38 to computer 32 in accordance with bridge control program 37 of PDA 38 and bridge control program 35 of computer 32 using standard operator interfaces for initiating the upload.

As a result of step F, the scanned bridge codes are stored in computer 32 for uploading to bridge server 20 over the Internet 100. As noted above, computer 32 and bridge server computer system 20 are both connected to the Internet 100. The connections to the internet can be continuous or dial up. In the case of a dial up connection, computer 32 connects to the Internet 100 prior to step G. Once connected to the Internet 100, computer 32 can send a command to bridge server computer system 20, in the form of a complex URL or other command containing the appropriate bridge code or codes, to search database 22 for action commands associated with the bridge codes stored in computer 32. For example, computer 32 can send a complex URL, having a CGI program request or the like, to bridge server computer system 20, in step G, in response to instructions in bridge control program 35.

In response to the command or plural commands from computer 32, bridge server computer system 20 will query database 22 to find the action commands indicating actions to be taken in response to each bridge code in step H. The action commands in database 22 for each bridge code should correspond to the bridge code instructions for the particular bridge code. For example, in the case of bridge code 154 illustrated in FIG. 2, the action command in database 22 will include instructions for causing a computer media copy of the article in tangible media object 150 to be downloaded to computer 32. The computer media copy of the article in tangible media object 150 can be stored on bridge server computer system 20 or on another computer coupled to the Internet 100, such as one of content servers 40. In the case of the copy being stored on one of content servers 40, the action command in database 22 includes instructions for addressing content server 40 and causing the appropriate download to computer 32. Once again, this can be accomplished through transmission of a complex URL with a CGI program request from bridge server computer system 20 to content server 40. In step I, the action indicated by action commands stored in correspondence with bridge code 154 in database 22 (downloading a copy of the article to computer 32 in this case) is taken.

In step J, it is determined if there are additional bridge codes to be uploaded from computer 32 to bridge server computer system 20. If not, the procedure ends. If so, the procedure returns to step F. It can be seen that, in the preferred embodiment described above, the user merely scanned in a bridge code from a tangible media object to automatically receive a computer media copy of the article in the tangible media object. However, the actions accomplished in response to scanning of the bridge code need not be limited to merely obtaining a copy of the article and in fact can take many forms, as described below.

For example, the action commands stored in database 22 can cause the automatic retrieval and download of a recipe for a meal featured in the article or advertisement of tangible media having a bridge code. Further, the action commands stored in database 22 can cause the automatic retrieval and download of a coupon for a product featured in the article or advertisement of tangible media having a bridge code. The coupon can be printed and taken to a store or the coupon can be retained in computer 32 or PDA 38 of client computer system 30 for download at the point of sale into a vendor computer or thin client. The coupon can include various conditional information such as expiration date data, data indicating a particular store or Web site that can accept the coupon, data indicating time increments through which the discount increases or decreases, data indicating the identity of the user, and the like. The coupon can be redeemed at a conventional "bricks and mortar" retail store or at a Web site over the Internet 100 or another network.

The action commands in database 22 can cause a Web page to be stored on bridge server 20 which provides a link or links to information related to tangible media object 150 from which bridge code 154 was scanned. For example, bridge code 154 can be in or on a book and the command instructions can cause a Web page to be displayed providing links to Web sites devoted to the author of the novel or other novels by the same author. In this manner, links to the desired computer media can be stored and accessed at any time through any device running a browser.

FIG. 4 is a representation of a portion of database 22. Of course, database 22 can be stored in computer readable form in known database formats, such as Microsoft EXCEL™, and can include action commands as machine code or the like. However, FIG. 4 represents database 22 as a look-up table having English language action commands 158 for the purpose of explanation. As illustrated in FIG. 4, when bridge code 154 having the value 42709 10028 is scanned, a computer media copy of the article from tangible media 150 will be downloaded to client computer system 30. Similarly, when bridge code 154 having the value 41370 10038 is scanned, a computer media coupon for a product featured in tangible media 150 will be downloaded to client computer system 30. When bridge code 154 having the value 54219 23400 is scanned, a Web page having links related to tangible media 150 will be displayed on client computer system 30. When bridge code 154 having the value 67213 14572 is scanned, a vendor Web page for purchasing goods or services described in tangible media 150 will be displayed on client computer system 30. When bridge code 154 having the value 67201 15427 is scanned, a Web page containing links to scores of a game discussed in tangible media object 150 and related interview videos is displayed on client computer system 30. When bridge code 154 having the value 47290 28100 is scanned, a Web page having links for travel and booking information for a destination described in tangible media object 150 is displayed. When bridge code 154 having the value 54912 43200 is scanned, a Web page containing links to a review and video preview of a move discussed in tangible media object 150 is displayed. Alternatively, each bridge code can have a corresponding link to computer media that is stored for later access through a browser.

Database 22 can be maintained and updated by a service provider to provide the desired results in response to any bridge code. The action commands can include instructions to utilize a particular folder or directory on client computer system 30 to facilitate organization of material.

Figure 5:
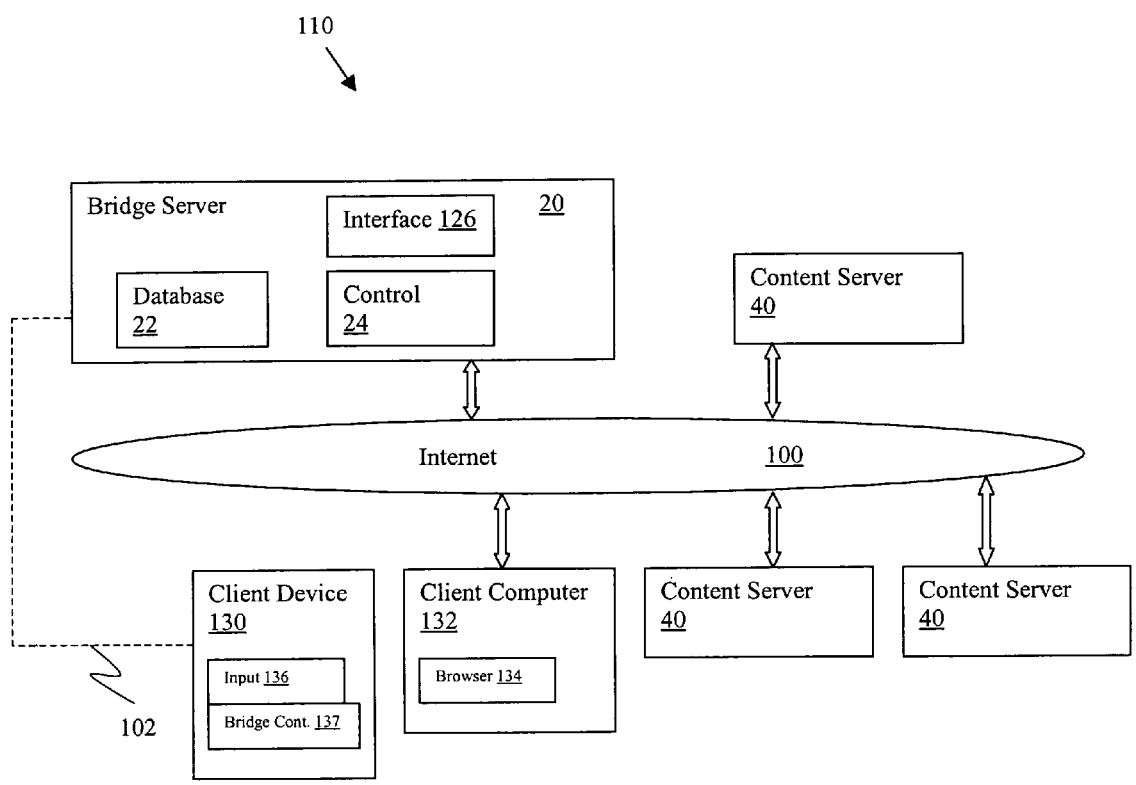
FIG. 5 is a block diagram of a computer architecture of a second preferred embodiment.

A second preferred embodiment of media bridge system 110 is illustrated in FIG. 5. Client device 130, having a connection to a wireless communication network 102, is connected to bridge server computer system 20, or the Internet 100. For example, client device 130 can establish a connection to a CDPD (cellular digital packet data), CDMA code division multiple access), TDMA (time division multiple access) GSM (global system for mobile communication), or any other type of wireless communication network.

Bridge server computer system 20 is connected typically through an ISP, to the Internet 100. Bridge server computer system 20 executes a Web server control application 24, known as an HTTP server application, stored in memory. Bridge server computer system 20 includes an interface 26 which receives incoming signals from the wireless communication network 102. For example, interface 126 can be a modem. In addition, bridge server computer system 20 can have at least one, though typically many, Web pages stored in a memory device thereof as files in HTML format and/or other formats. Further, bridge server computer system 20 includes database 22 stored in the memory device as described in detail below.

Content servers 40 and client computer 132 can also be connected to bridge server computer system 20 through the Internet 100. In the second preferred embodiment, the Internet 100 and wireless communication network 102 serve as a communication channel. However, any type of communication channel can be used. For example, the communication channel can be a LAN or a WAN, or the like using any type of communication hardware and protocols. Communication can be accomplished over electric cable, fiber optic cable, or in a wireless manner using radio frequency, infrared, or other technologies.

Client device 130 of the second preferred embodiment can be a cellular phone, wireless PDA, wireless digital phone, or any other wireless communication device connected to wireless communication network 102 or the Internet 100 in a known manner. Client device 130 includes input device 136 to transmit a bridge code 154 to bridge server computer system 20 to be stored on the bridge server computer system 20 and accessed by client computer 132 at a later time, as described below. Also, client device 130 includes bridge control program 137 to control collection of bridge codes as described below.

Client computer 132 of the second preferred embodiment can be any personal computer capable of establishing a connection to the Internet 100, such as a desktop computer, laptop computer, network computer or an Internet appliance. Client computer 132 includes a browser 134 that supports the suite of Internet protocols. Client computer 132 can request display of a Web page stored on bridge server computer system 20 by issuing a URL request through the Internet 100 to bridge server computer system 20 in the manner described above.

As noted above, client device 130 includes input device 136 for inputting bridge code 154 to be transmitted over wireless communication network 102 to bridge server computer system 20. Input device 136 of the second preferred embodiment can be a keypad, bar code scanner, keyboard, microphone, bar code reader, infrared receiver, radio frequency receiver, or any other device for inputting the bridge code 154. The bridge code 154 in the second preferred embodiment is an identifier, such as a number, a word, alpha-numerics, bar code, an image, or the like, for identifying a tangible media object in media bridge system 110.

Figure 6:
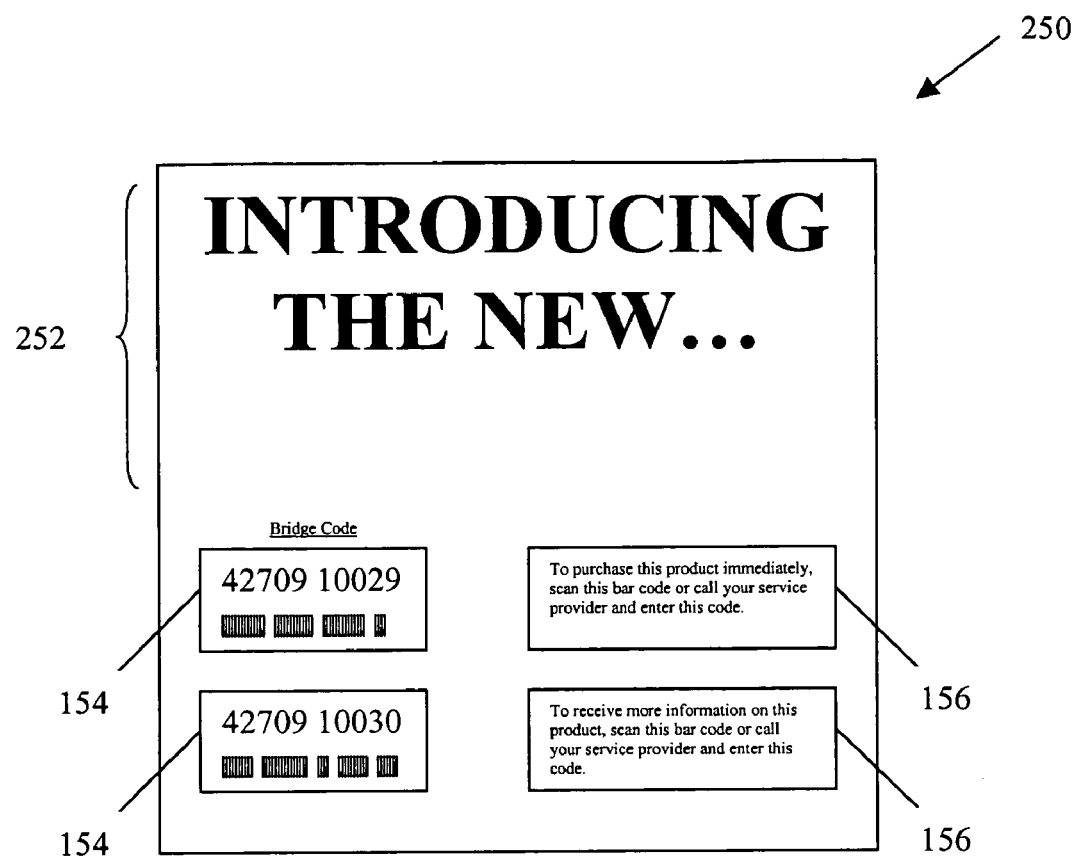
FIG. 6 illustrates an example of a tangible media object of the second preferred embodiment.

FIG. 6 illustrates an example of a tangible media object that can be used in connection with the second preferred embodiment. Tangible media object 250 can be any object, such as a posted sign, billboard, or advertisement in a magazine or newspaper. Tangible media object 250 includes body 252 typically having a message and graphic. Tangible media object 250 also includes bridge codes 154, in the form of a number and bar code in the second preferred embodiment. Conventionally, if a person viewing this advertisement desires to obtain information from it, the person will have to remember the desired information or write the desired information down. However, these procedures require the person to rely heavily on their memory or keep track of the written information for later review. Also, these procedures do not permit the person to automatically purchase the object being advertised or take other desired actions relating to the subject matter of tangible media object 250 at a later time.

In the second preferred embodiment, the person need only input the desired bridge code 154 into client device 130, as indicated in the corresponding bridge code instruction 156 to complete the desired user action. For example, the user can use client device 130 to call their service provider and enter the bridge code to store a link to the corresponding computer media object on bridge server computer system 20 for later access by the user from client computer 132.

Figure 7:
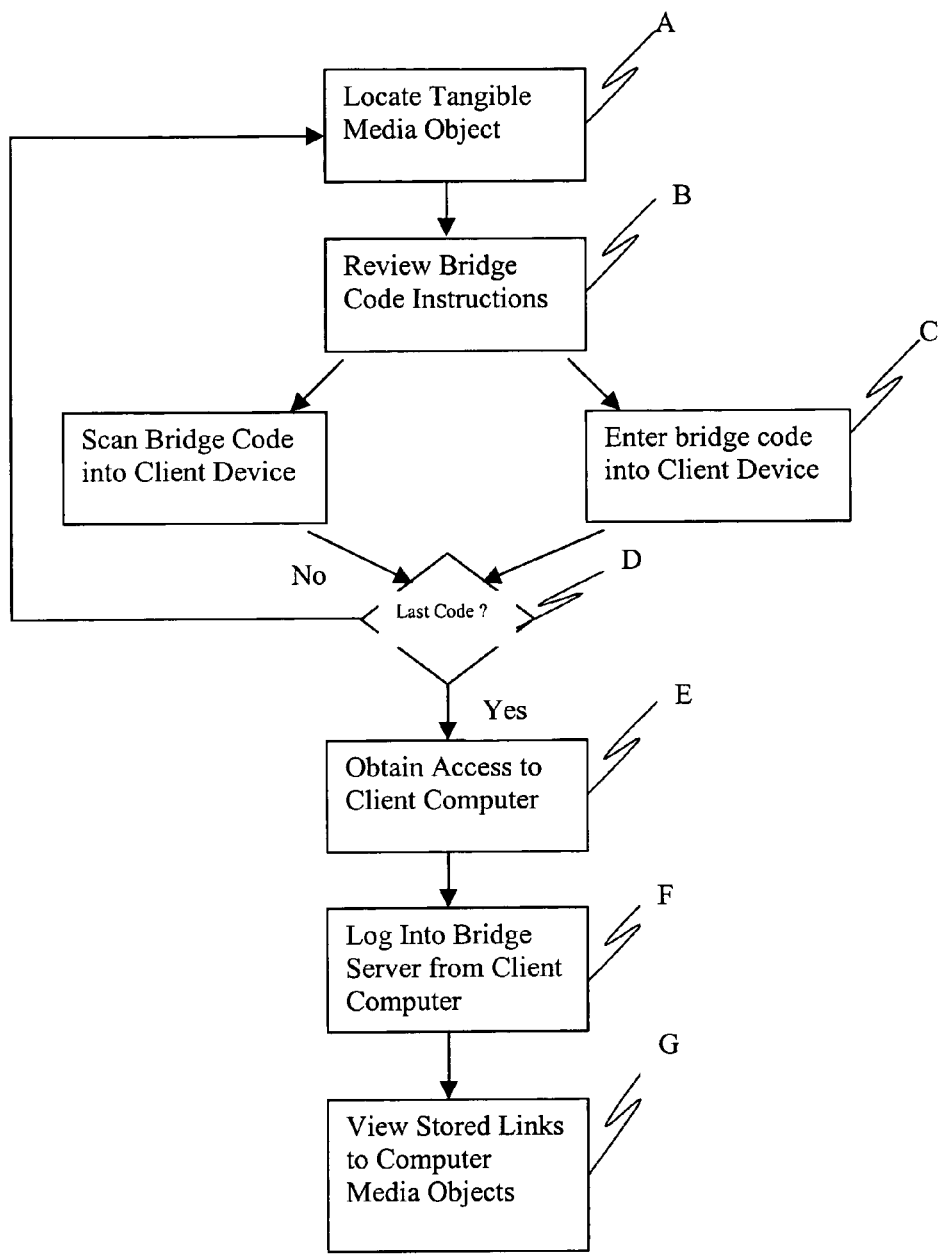
FIG. 7 is a flowchart of the bridging method of the second preferred embodiment.

FIG. 7 illustrates the procedure for acquiring bridge codes and accessing the stored links to computer media objects from client computer 132. In step A, the user locates tangible media object 250. For example, the person may be reading a magazine and find tangible media object 250 relating to a product of interest. Alternatively, the person may be travelling in a car, train, or the like and may see tangible media object 250, such as a billboard or the like. In step B, the user reviews bridge code instructions 156 to ascertain what actions will be available by entering bridge code 154 into client device 130. In the example of FIG. 6, inputting bridge code 154 will either allow purchase of the product, or allow subsequent access of related information by the user, depending on which action is desired by the user.

Assuming that the action indicated in the bridge code instructions is desirable to the user, the user then inputs bridge code 154 by inputting the number into the keypad on the client device 130 (step C1), scanning bridge code 154 into client device 130 (step C2), or in any other manner. For example, client device 130 can be a cellular phone with a numbered keypad for typing the bridge code 154 in a known manner. As a result of step C, bridge control program 137 communicates with interface 126 of bridge server computer system 20 to store the bridge code for later access by the user. Note that the interface 126 on the bridge server computer system can be configured to communicate with the user to accept manually entered bridge codes 154 or to accept bridge codes 154 through voice recognition. For example, control program can ask the user to either dictate the numbers into the phone or type them in using the keypad.

In step D, the user decides if the previously entered bridge code is the last code to be inputted at this time. If not, the procedure can return to step A for execution of steps A through D for any other bridge codes to be entered. When all desired bridge codes 154 have been transmitted to bridge server computer system 20 over wireless communication network 102, the user can access the desired computer media at any subsequent time, as described below with respect to steps E through G. Significantly, the time period between steps D and E can be of any length to permit access to the computer media at any time.

In step E, the person who previously entered bridge codes into client device 130, or another authorized person, will then obtain access to client computer 132. As noted above, client computer 132 and bridge server computer system 20 are both connected to the Internet 100. The connections to the Internet can be continuous or dial up. Once connected to the Internet, client computer 132 can log into the bridge server computer system in step F. As a result of step F, the user can then access the links to the computer media objects corresponding to the bridge codes that were previously entered. To accomplish this, the client computer 132 can send a command to bridge server computer system 20, in the form of a complex URL or other command containing the appropriate identifying information, to display a compiled list of links on client computer 132, corresponding to the previously entered bridge codes, to the corresponding computer media objects on client computer 132 in the form of a Web page.

Figure 8:
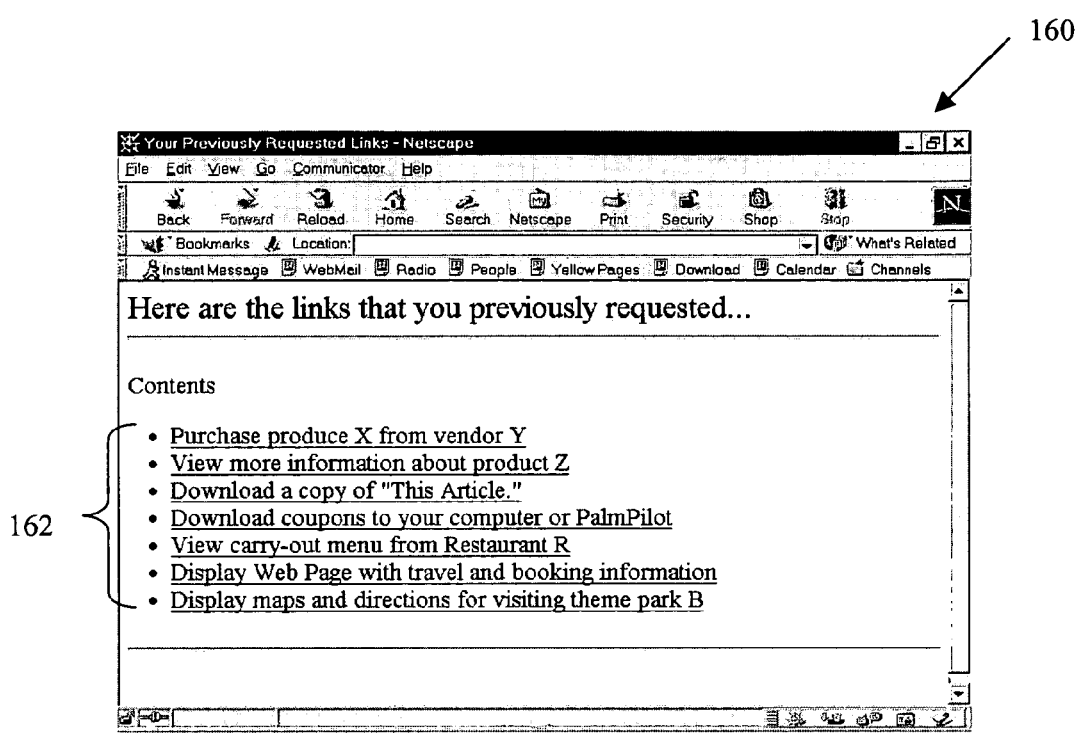
FIG. 8 illustrates an example of stored computer media links of the second preferred embodiment.

FIG. 8 represents a sample Web page 160 of links 162 to computer media objects in media bridge 110. In this case, the action command in database 22 will include instructions to store the links to computer media, corresponding to the bridge codes 154, in a Web page. For example, the links can be stored as a reference on a page in HTML format. Browser 134 of client computer 132 allows the user to view links 162 in the form of a Web page, in step G. Once the user is viewing their previously requested links 162, they can click on one of those links 162, using a mouse or the like, to complete the desired action. For example, the user can click on link 162, to purchase a product over the Internet 100 or to access information related to the tangible media. This interface permits the user to store, access, manage, maintain, index, or otherwise manipulate the linked computer media.

In the second preferred embodiment, the client device 130 was a handheld device, which is portable, and thus can be used in any environment. However, client device 130 can be an on-board computer in any vehicle, such as a car, truck, or boat. Tangible media in this case can be a billboard or the like and computer media objects can be geographical maps, directions, or the like. Also, client device 130 can be a Wireless Application Protocol (WAP) compliant device and running a browser and bridge codes 154 can be entered directly into a server using the browser interface.

It can be seen that the invention bridges the gap between tangible media and computer media by coupling the two media in an integrated manner. However, the invention does not diminish the power of tangible media for persons not having computer access or otherwise not desiring to utilize the invention. Further, the invention is easily integrated in both the tangible media and the computer media without substantial changes to the creation and distribution of the two media. For example bridge codes can easily be inserted into tangible media and action commands can be placed in the database to call up existing contents on the Web or to store links to desired content for later retrieval. The bridge server can log all transactions conducted as a result of action commands for the purpose of billing vendors, developing customer profiles, or the like. Coupons and the like can be exclusive to the bridge codes, i.e. not available elsewhere and thus can facilitate determination of the effectiveness of an advertisement in the form of a tangible media object. The bridge server can also store links to the computer media objects for access by the user at a later time. In so doing, tangible media objects will become more readily available to users and accessible when needed and when the proper display hardware is available without the need for the user to keep track of tangible media.

The client computer system of the preferred embodiment includes a PDA and a computer coupled to the Internet. However, the client computer system can have any configuration that permits entry of bridge codes and communication with the bridge server computer system. For example, the client computer system can be merely a PDA or other thin client coupled to the Internet through a wired or wireless link. Also, the client computer system can be a computer, such as a personal computer, coupled to the Internet through a wired or wireless link without the need for the PDA. Of course, in such a case, the input device will be on the computer. The communications channel in the preferred embodiment is the Internet. However, any communications channel can be used. The bridge server computer system can include plural computers at one location or at plural locations. The various control programs can be written in any appropriate language and will be apparent to one of ordinary skill in the art based on the disclosure herein.

The input device can assume any form. For example, the bridge codes can be scanned with an optical scanner, inputted manually through a keyboard, keypad, thumbweels or the like, read from a magnetic strip embedded in the tangible media object, or in any other manner. The bridge codes can be inputted into a smart card that forms a portion of the client computer system and thus obviate the need to have a thin client or computer at the point of inputting the bridge code. For example, the bridge code can be loaded to the smart card from a point of sale display and subsequently downloaded to a computer. The content servers can be associated with any party and can take any form. The bridge code can be a number, an alphanumeric, a word, a symbol, combinations thereof or any other identifying code. The bridge code instructions can include, text, an icon, or any other indication of an action corresponding to the bridge code. Of course, the bridge code instruction is optional. The bridge code and bridge code instructions can be combined into a single code/symbol that identifies the tangible media object to the bridge server and is discernable by the user to indicate an associated action.

In the preferred embodiment, the database query is executed at the bridge server, however, the database, the query, and any other processing can be distributed amongst the client computer, the bridge server or other computers as desired Processed bridge codes can be deleted from the client computer or saved for reference.

The operator of the bridge server can produce revenue from the invention in various ways. For example, a newspaper or other periodical can pay to have bridge codes assigned to its articles and related action commands stored in the data base. Further the action commands can refer the user to other sources and revenue can be collected from these sources. Advertisers can pay for a bridge code to be assigned to their advertisements and for related action commands to be stored in the data base. For example, the action commands can drive the user to a Web page devoted for advertising or selling a product. Publisher's can pay to have bridge codes associated with published materials and action commands that direct the user to other materials published by the publisher, such as archive materials.

Further, entertainment producers can put bridge codes in programs for plays, movie and the like to direct the user to related information, promotional materials, directions to nearby restaurants, and the like. Gaming establishments can use bridge codes to direct customers to handicapping data, online gaming and other related activities. Publishers of research materials can use bridge codes to direct users to related research materials. In each case, the operator of the bridge server can collect revenue based on bridge code "hits", based on item (e.g. monthly), based on media materials delivered, based on products or services ordered, or in any fashion.

The invention has been described through a preferred embodiment. However various modifications can be made without departing from the scope of the invention as defined by the appended claims and legal equivalents.

What is claimed:

1. A computer architecture for providing a bridge between tangible media and computer media, said computer architecture comprising:

a bridge server computer system including a database and a server control program;

a portable client device, including a bridge control program and an input device, said portable client device adapted to receive and store at least one bridge code associated with a tangible media object, which was transmitted from a transmitter associated with the object; and a communications channel coupling said bridge server computer system and said client device to download the previously stored bridge codes from the client device to the bridge server computer system;

whereby said server control program is operative to query said database based on the received bridge codes, to display a plurality of links to computer media, wherein the links correspond to the received bridge codes and, upon activation of one of said plurality of links, to execute action commands in said database in correspondence to the bridge code associated with the activated link.

2. A computer architecture as recited in claim 1, wherein the links are displayed on a Web page.

3. A computer architecture as recited in claim 1, wherein said portable client device communicates with a client computer system via a local communications channel selectively coupling said client computer system to said portable client device, said input device being disposed in said portable client device and the bridge codes being uploaded from said portable client device to said client computer.

4. A computer architecture as recited in claim 3, wherein said local communications camel is an infrared communications channel.

5. A computer architecture as recited in claim 3, wherein said local communications channel is a radio frequency communications channel.

6. A computer architecture as recited in claim 3, wherein the action commands comprise instructions for downloading data to said client computer system from one of said bridge server computer system or another server coupled to said communications channel.

7. A computer architecture as recited in claim 6, wherein said data comprises a computer media copy of an article in the tangible media object.

8. A computer architecture as recited in claim 6, wherein said data comprises a computer media coupon related to products described in the tangible media object.

9. A computer architecture as recited in claim 6, wherein said data comprises a computer media copy of information related to an article in the tangible media object.

10. A computer architecture as recited in claim 3, wherein said client computer system comprises a wireless communication device.

11. A computer architecture as recited in claim 10, wherein said communications channel is a wireless communications network.

12. A computer architecture as recited in claim 10, wherein said communications channel is a computer network.

13. A computer architecture as recited in claim 12, wherein said computer network is the Internet.

14. A computer architecture as recited in claim 10, wherein said wireless communication device is a cellular phone.

15. A computer architecture as recited in claim 14, wherein said input device is a keypad.

16. A computer architecture as recited in claim 14, wherein said input device is an audio receiver.

17. A computer architecture as recited in claim 10, wherein said wireless communication device is a wireless digital phone.

18. A computer architecture as recited in claim 17, wherein said input device is a keypad.

19. A computer architecture as recited in claim 17, wherein said input device is an audio receiver.

20. A computer architecture as recited in claim 10, wherein said wireless communication device is a personal digital assistant having wireless communications capabilities.

21. A computer architecture as recited in claim 10, wherein said wireless communication device is a vehicle on-board computer.

22. A computer architecture as recited in claim 21, wherein said on-board computer comprises a navigational system.

23. A computer architecture as recited in claim 3, wherein the action commands comprise instructions for displaying a Web page stored on one of said bridge server computer system or a separate content server coupled to said communications channel.

24. A computer architecture as recited in claim 3, wherein the action commands comprise instructions for downloading data to said client computer system from one of said bridge server computer system or another server coupled to said communications channel.

25. A computer architecture as recited in claim 24, wherein said data comprises a computer media copy of an article in the tangible media object.

26. A computer architecture as recited in claim 24, wherein said data comprises a computer media coupon related to products described in the tangible media object.

27. A computer architecture as recited in claim 24, wherein said data comprises a computer media copy of information related to an article in the tangible media.

28. A computer architecture as recited in claim 24, wherein said data comprises geographic maps.

29. A computer architecture as recited in claim 24, wherein said data comprises navigational information.

30. A computer architecture as recited in claim 24, wherein said data comprises audio files to be communicated by a vehicle on-board computer.

31. A computer architecture as recited in claim 1, wherein the action commands comprise instructions for displaying a Web page stored on one of said bridge server computer system or a separate content server coupled to said communications channel.

32. A computer architecture as recited in claim 1, wherein said portable client device is a wireless phone.

33. A computer architecture as recited in claim 1, wherein one of the plurality of links is to a vendor Web site for facilitating purchase of a product described in the tangible media object.

34. A computer architecture as recited in claim 1, wherein said input device is a bar code reader adapted to read the bridge code in the form of bar codes.

35. A computer architecture as recited in claim 1, wherein said communications channel is a computer network.

36. A computer architecture as recited in claim 35, wherein said computer network is the Internet.

37. A computer architecture as recited in claim 1, wherein said transmitter device is a radio frequency transmitter.

38. A computer architecture as recited in claim 37, wherein said input device is a radio frequency receiver.

39. A computer architecture as recited in claim 1, wherein said transmitter device is an infrared transmitter.

40. A computer architecture as recited in claim 39, wherein said input device is an infrared receiver.

41. A computer architecture as recited in claim 1, wherein the action commands comprise instructions for downloading data to said portable client device from one of said bridge server computer system or another server coupled to said communications channel.

42. A method for bridging tangible media and computer media, said method comprising the steps of:
creating a database of bridge codes and action commands corresponding to the bridge codes;
receiving in a portable client device at least one bridge code associated with a tangible media object, which was transmitted by a transmitter associated with the tangible media object, and storing each received bridge code therein;
after storing each received bridge code, communicating the each bridge code to a bridge server;
querying the database based on each communicated bridge code;
displaying at least one link to the computer media, each link corresponding to one communicated bridge code; and
upon activation of a link, executing an action command stored in the database in correspondence to the bridge code associated with the activated link.

43. A method as recited in claim 42, further comprising uploading the bridge codes from the portable client device to a client computer over a local communications channel.

44. A method as recited in claim 42, wherein said action commands comprise instructions for displaying a Web page stored on one of the bridge server computer system or a separate content server.

45. A method as recited in claim 42, wherein said action commands comprise instructions for downloading data to a client computer system from one of the bridge server computer system or another server.

46. A method as recited in claim 45, wherein hyper links to the data are stored on the bridge server.

47. A method as recited in claim 45, wherein the data comprises a computer media copy of an article in the tangible media object.

48. A method as recited in claim 45, wherein the data comprises a computer media coupon related to products described in the tangible media object.

49. A method as recited in claim 45, wherein the data comprises a computer media copy of information related to an article in the tangible media object.

50. A method as recited in claim 45, wherein the data comprises geographic maps.

51. A method as recited in claim 45, wherein the data comprises navigational information.

52. A method as recited in claim 45, wherein the data comprises audio files to be communicated by a vehicle on-board computer.

53. A method as recited in claim 42, wherein the link is displayed on a Web page.

54. A method as recited in claim 53, wherein the link is to a vendor Web site for facilitating purchase of a product described in the tangible media object.

55. A method as recited in claim 42, wherein said communicating step copses communicating over a computer network.

56. A method as recited in claim 55, wherein the computer network is the Internet.

57. A method as recited in claim 42, wherein said receiving step comprises reading the bridge code in the form of an infrared signal.

58. A method as recited in claim 42, wherein said receiving step comprises reading the bridge code in the form of a radio frequency signal.

59. A method as recited in claim 42, wherein said communicating step comprises communicating over a wireless network.

60. A method as recited in claim 42, wherein said action commands comprise instructions for downloading data to the potable client device from one of the bridge server computer system or another server.

61. A method as recited in claim 60, wherein the data comprises a computer media copy of an article in the tangible media object.

62. A method as recited in claim 60, wherein the data comprises a computer media coupon related to products described in the tangible media object.

63. A method as recited in claim 60, wherein the data comprises a computer media copy of information related to an article in the tangible media object.

64. A method as recited in claim 60, wherein the data comprises geographic maps.

65. A method as recited in claim 60, wherein the data comprises navigational information.

66. A method as recited in claim 60, wherein the data comprises audio files to be communicated by a vehicle on-board computer.

* * * * *

UNITED STATES PATENT AND TRADEMARK OFFICE
CERTIFICATE OF CORRECTION

PATENT NO. : 7,065,559 B1
APPLICATION NO. : 09/596431
DATED : June 20, 2006
INVENTOR(S) : David Weiss Page 1 of 1

It is certified that error appears in the above-identified patent and that said Letters Patent is hereby corrected as shown below:

In the Claims

In claim 1, column 13, line 4, "associated" should read --included--

In claim 42, column 15, line 13, "associated" should read --included--

Signed and Sealed this
Twenty-eighth Day of May, 2013

Teresa Stanek Rea
*Acting Director of the United States Patent and Trademark Office*